US008712209B2

(12) United States Patent
Ohki et al.

(10) Patent No.: US 8,712,209 B2
(45) Date of Patent: Apr. 29, 2014

(54) PLAYBACK DEVICE, PLAYBACK METHOD, AND COMPUTER PROGRAM

(75) Inventors: Yoshihito Ohki, Tokyo (JP); Tomohiko Hishinuma, Kanagawa (JP); Ryohei Morimoto, Kanagawa (JP); Junya Ono, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/463,484

(22) Filed: May 3, 2012

(65) Prior Publication Data

US 2012/0288253 A1 Nov. 15, 2012

(30) Foreign Application Priority Data

May 12, 2011 (JP) .................................. 2011-107109

(51) Int. Cl.
*H04N 5/93* (2006.01)
(52) U.S. Cl.
USPC ...................... 386/230; 386/E5.028; 386/332
(58) Field of Classification Search
USPC ............................................ 386/332, E5.028
See application file for complete search history.

(56) References Cited

U.S. PATENT DOCUMENTS 7,653,761 B2 * 1/2010 Juster et al. ..................... 710/18
2010/0042595 A1 * 2/2010 Chen et al. ........................ 707/3

FOREIGN PATENT DOCUMENTS

JP 4577438 9/2010

* cited by examiner

*Primary Examiner* — Thai Tran
*Assistant Examiner* — Nien-Ru Yang
(74) *Attorney, Agent, or Firm* — Frommer Lawrence & Haug LLP; William S. Frommer

(57) ABSTRACT

There is provided a playback device including a content playback unit configured to playback content, a playlist acquisition unit configured to acquire, while the playback unit is playing back the content on the basis of a playlist, at least one external playlist from outside, the external playlist having at least two pieces of content that are common to content in the playlist and having a matching playback order of at least the two consecutive pieces of content, and a playlist display unit configured to display the playlist and the external playlist acquired by the playlist acquisition unit such that the playlists are linked at positions of the consecutive matching pieces of content.

12 Claims, 10 Drawing Sheets

PLAYBACK DEVICE, PLAYBACK METHOD, AND COMPUTER PROGRAM

BACKGROUND

The present disclosure relates to a playback device, a playback method, and a computer program.

A content playback device that plays back content in accordance with a playlist created by a user by freely combining content such as audio, still images, or moving images is widely known. This playlist is created by a user by combining content. Thus, such a playlist can be said to reflect the preference of the user.

In recent years, a mechanism of sharing a playlist with other users by making a playlist, which has been created by a user via a network, open to the public has also been developed. Thus, not only the way to create a playlist but also how to enjoy the content by, for example, playing back content on the basis or a playlist created by another person has also been provided.

As the number of playlists of other persons made open to the public via a network is huge, it would be quite difficult for a user to search for a playlist that suits his/her preference. Thus, a technique that can easily acquire a playlist that suits one's preference is disclosed (for example, see JP 4577438B).

SUMMARY

The technique of JP 4577438B is adapted to easily search for a playlist that suits one's preference by acquiring a playlist that includes content having content attributes that match the content attributes of a single piece of content. However, this technique is adapted to search for a playlist using, as a key, only the content attributes of a single piece of content. Thus, the retrieved playlist is not always a playlist that suits one's preference.

A playlist is not just a combination of pieces of content, but is one of the most important element's of the playback order of the content. Thus, by searching for a playlist that not only contains matching content, but also has a matching playback order of content, it becomes possible to find out a playlist that is closer to one's preference.

In light of the foregoing, it is desirable to provide a playback device, a playback method, and a computer program that are novel and improved and that can acquire, by searching for a playlist whose playback order of pieces of content consecutively matches, a playlist that suits one's preference.

According to an embodiment of the present disclosure, there is provided a playback device including a content playback unit configured to playback content, a playlist acquisition unit configured to acquire, while the playback unit is playing back the content on the basis of a playlist, at least one external playlist from outside, the external playlist having at least two pieces of content that are common to content in the playlist and having a matching playback order of at least the two consecutive pieces of content, and a playlist display unit configured to display the playlist and the external playlist acquired by the playlist acquisition unit such that consecutive matching pieces of content are linked.

According to the present disclosure, the content playback unit plays back content, and the playlist acquisition unit, while the playback unit is playing back the content on the basis of a playlist, acquires at least one external playlist from outside, the external playlist having at least two pieces of content that are common to content in the playlist and having a matching playback order of at least the two consecutive pieces of content. Then, the playlist display unit displays the playlist and the external playlist acquired by the playlist acquisition unit such that the playlists are linked at positions of consecutive matching content.

According to another embodiment of the present disclosure, there is provided a playback method including playing back content, acquiring, while the playback step is playing back content on the basis of a playlist, at least one external playlist from outside, the external playlist having a playback order of at least two consecutive pieces of content that matches a playback order of content of the playlist, and displaying the playlist and the external playlist acquired by the playlist acquisition step such that the playlists are linked at positions of consecutive matching content.

According to still another embodiment of the present disclosure, there is provided a computer program for causing a computer to execute playing back content, acquiring, while the playback step is playing back content on the basis of a playlist, at least one external playlist from outside, the external playlist having a playback order of at least two consecutive pieces of content that matches a playback order of content of the playlist, and displaying the playlist and the external playlist acquired by the playlist acquisition unit such that the playlists are linked at positions of consecutive matching content.

DETAILED DESCRIPTION OF THE EMBODIMENTS

Figure 1:
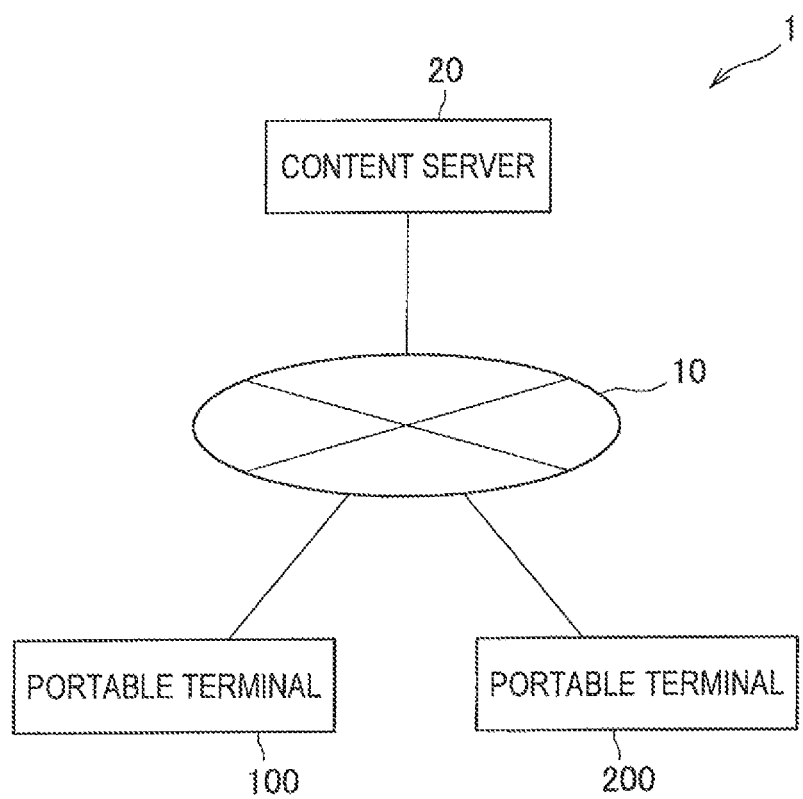
FIG. 1 is an explanatory diagram showing the overall configuration of a content playback system 1 in accordance with an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be made in the following order.

<1. Embodiment of the Present Disclosure>
[1-1. Overall Configuration of Content Playback System]
[1-2. Functional Configuration of Portable Terminal]
[1-3. Functional Configuration of Content Server]
[1-4. Operation of Portable Terminal]
[1-5. Display of Playlist]
<2. Conclusion>

1. Embodiment of the Present Disclosure

[1-1. Overall Configuration of Content Playback System]

First, the overall configuration of a content playback system in accordance with an embodiment of the present disclosure will be described. FIG. 1 is an explanatory diagram showing the overall configuration of a content playback system 1 in accordance with an embodiment of the present disclosure. Hereinafter, the overall configuration of the content playback system 1 in accordance with an embodiment of the present disclosure will be described with reference to FIG. 1.

As shown in FIG. 1, the content playback system 1 in accordance with an embodiment of the present disclosure has a configuration in which portable terminals 100 and 200 and a content server 20 are mutually connected via a network 10.

The content server 20 stores data about content played back by each of the portable terminals 100 and 200. Examples of the data about content played back by each of the portable terminals 100 and 200 and stored in the content server 20 include data on the content played back by each of the portable terminals 100 and 200 and data on a playlist that defines the playback order of the content played back by each of the portable terminals 100 and 200. Herein, the data on the playlist that defines the playback order of the content played back by each of the portable terminals 100 and 200 is created by the user of each of the portable terminals 100 and 200, and is uploaded to the content server 20 via the network 10.

Each of the portable terminals 100 and 200 has a function of playing back content such as audio, still images, or moving images. In addition, each of the portable terminals 100 and 200 has a function of playing back content in accordance with a playlist. Editing of the playlist may be executed either by the portable terminal 100 or 200 or by another information processing device (not shown) different from the portable terminals 100 and 200. When a playlist is edited by an information processing device different from the portable terminals 100 and 200, the playlist is transferred from the information processing device to the portable terminals 100 and 200, whereby the portable terminals 100 and 200 can play back content on the basis of the playlist.

Each of the portable terminals 100 and 200 has a function of uploading a playlist created by a user to the content server 20 via the network 10.

Although FIG. 1 shows two portable terminals 100 and 200, it is needless to mention that the number of portable terminals is not limited thereto in the present disclosure.

The overall configuration of the content playback system 1 in accordance with an embodiment of the present disclosure has been described above with reference to FIG. 1. Next, the functional configuration of the portable terminal in accordance with an embodiment of the present disclosure will be described with reference to FIG. 1.

[1-2. Functional Configuration of Portable Terminal]

Figure 2:
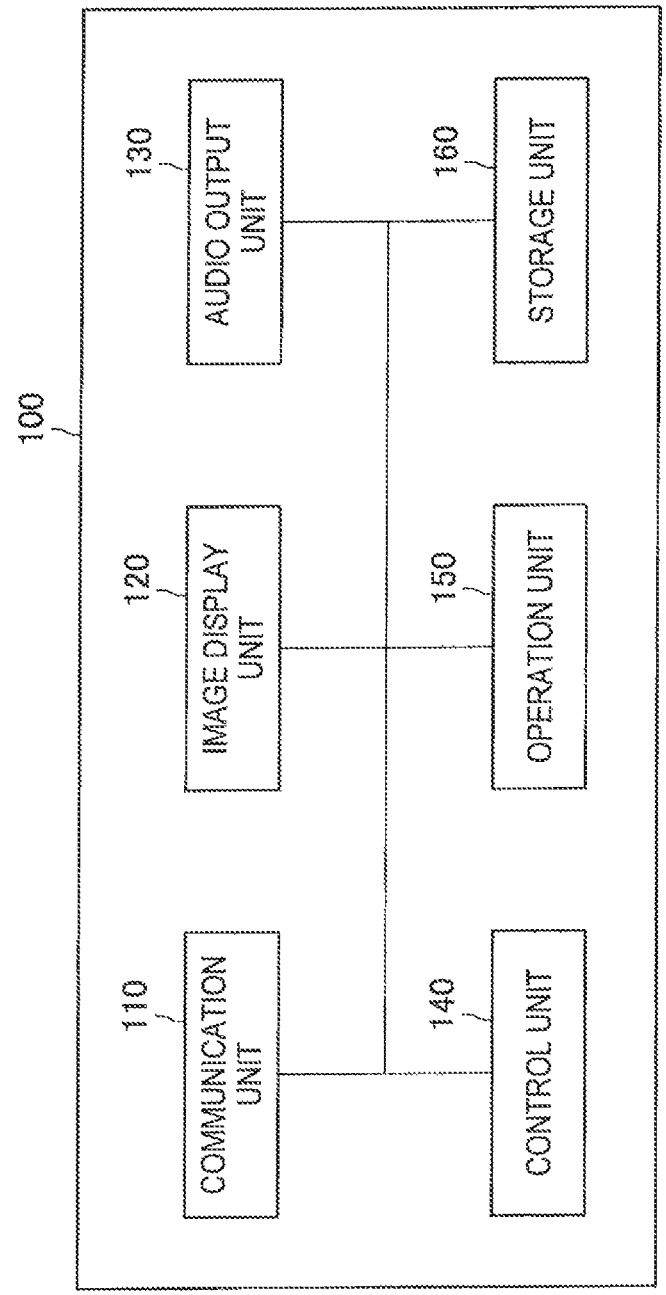
FIG. 2 is an explanatory diagram showing the functional configuration of a portable terminal 100 in accordance with an embodiment of the present disclosure.

FIG. 2 is an explanatory diagram showing the functional configuration of the portable terminal 100 in accordance with an embodiment of the present disclosure. Hereinafter, the functional configuration of the portable terminal 100 in accordance with an embodiment of the present disclosure will be described with reference to FIG. 2.

As shown in FIG. 2, the portable terminal 100 in accordance with an embodiment of the present disclosure includes a communication unit 110, an image display unit 120, an audio output unit 130, a control unit 140, an operation unit 150, and a storage unit 160.

The communication unit 110 communicates with another device via the network 10. In this embodiment, the communication unit 110 accesses the content server 20 via the network 10, and acquires a playlist recorded on the content server 20 or content that is not held by the portable terminal 100.

The image display unit 120 displays images. The image display unit 120 includes, for example, a liquid crystal display device or an organic EL display, and is configured to display images on the basis of predetermined image signals.

In this embodiment, while playback of content is executed by the control unit 140, the image display unit 120 displays information about the played back content. Examples of the information about the played back content include a title of the content, an artist name of the content, and the playback time or remaining time of the content. In addition, when the content played back by the control unit 140 is a moving image, the image display unit 120 also displays the moving image.

In this embodiment, while playback of content is executed by the control unit 140 on the basis of a playlist, the image display unit 120 displays information about the played back content as well as the playlist to which the content belongs. Though the details will be described later, in this embodiment, a playlist is displayed with a circle, and symbols or marks that represent content are arranged the circumference of the circle.

The audio output unit 130 outputs audio. The audio output unit 130 includes a speaker or earphones, for example, and is configured to output audio on the basis of a predetermined audio signal.

In this embodiment, while playback of content is executed by the control unit 140, the audio output unit 130, if the played back content includes audio, outputs the audio.

The control unit 140 controls, the operation of the portable terminal 100. Specifically, the control unit 140 controls communication of the communication unit 110, image display of the image display unit 120, audio output of the audio output unit 130, or the like. The control unit 140 includes a CPU (Central Processing Unit), for example.

The operation unit 150 receives an operation of the user of the portable terminal 100. The operation unit 150 may include various buttons or sensors to operate the portable terminal 100. In addition, the operation unit 150 may include a touch panel integrated with the image display unit 120. The control unit 140 controls the operation of the portable terminal 100 on the basis of a user operation on the operation unit 150.

The storage unit 160 includes nonvolatile memory such as flash memory, for example, and stores computer programs for operating the portable terminal 100, content played back by the control unit 140, and a playlist designating the playback order of content. Computer programs for operating the portable terminal 100, stored in the storage unit 160, are read and sequentially executed by the control unit 140. In addition, content stored in the storage unit 160 is read and played back by the control unit 140. When content is played back, if a user designates playback of the content on the basis of a playlist, the playlist stored in the storage unit 160 is read by the control unit 140, whereupon the control unit 140 performs a content playback process on the basis of the playlist.

Figure 3:
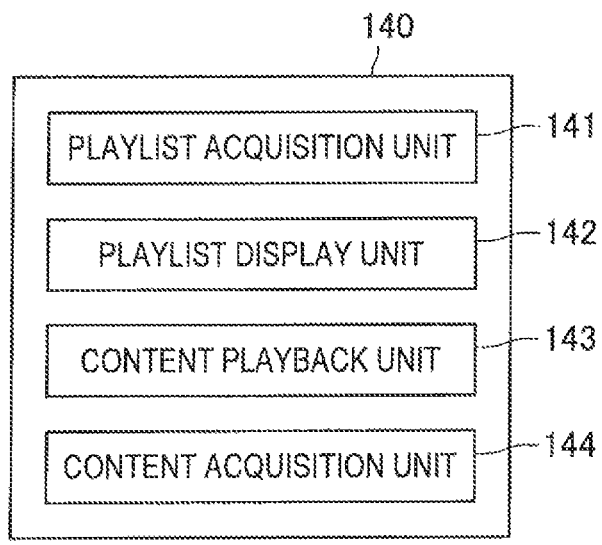
FIG. 3 is an explanatory diagram showing the functional configuration of a control unit 140 in accordance with an embodiment of the present disclosure.

FIG. 3 is an explanatory diagram showing the functional configuration of the control unit 140 in accordance with an embodiment of the present disclosure. As shown in FIG. 3, the control unit 140 in accordance with an embodiment of the present disclosure includes a playlist acquisition unit 141, a playlist display unit 142, a content playback unit 143, and a content acquisition unit 144.

The playlist acquisition unit 141 accesses the content server 20 via the network 10, and acquires a playlist that matches a predetermined condition, recorded on the content server 20. Herein, the predetermined condition in this embodiment is a condition that, when the control unit 140 performs a content playback process on the basis of a playlist, the order of at least two pieces of content designated by the playlist should match. When such a playlist is acquired from the content server 20, it becomes possible to find out a playlist that suits the preference of the user and has been created by another user.

The playlist display unit 142 causes the image display unit 120 to display the playlist. As described above, in this embodiment, a playlist is displayed with a circle, and symbols or marks that represent content are arranged on the circumference of the circle. Then, when the playlist acquisition unit 141 acquires a playlist that matches the aforementioned condition, the playlists are displayed with circles such that the playlists cross at positions of the matching content. A specific method of displaying a playlist on the image display unit 120 by the playlist display unit 142 is described below.

As described above, the playlist display unit 142 can display a plurality of playlists on the image display unit 120. Herein, in order to make a playlist designated by the user distinguishable, the playlist display unit 142 may display the playlist designated by the user and (an)other playlist(s) in different colors. In addition, when a plurality of playlists are displayed on the image display unit 120 by the playlist display unit 142, it becomes possible to allow the user to select a playlist via the operation unit 150.

The content playback unit 143 plays back the content stored in the storage unit 160. When content is played back, if a user designates playback of the content on the basis of a playlist, the content playback unit 143 plays back the content stored in the storage unit 160 in the order designated by the playlist.

Content designated by the playlist acquisition unit 141 using a playlist acquired from the content server 20 may include content that is not stored in the storage unit 160. When the user selects playback of content on the basis of the playlist acquired from the content server 20, there is a possibility that content that is not stored in the storage unit 160 may be played back. In such a case, the content acquisition unit 144 described below acquires the content from the content server 20, and the content playback unit 143 plays back the content acquired by the content server 20.

The content acquisition unit 144 acquires content from the content server 20. In particular, when the playlist acquired from the content server 20 includes content that is not stored in the storage unit 160, the content acquisition unit 144 acquires the content from the content server 20. The content acquired by the content acquisition unit 144 is played back by the content playback unit 143.

The control unit 140 can have a functional configuration such as the one shown in FIG. 3 reading, for example, the computer program stored in the storage unit 160 and executing the read computer program.

The functional configuration of the portable terminal 100 in accordance with an embodiment of the present disclosure has been described above. Next, the functional configuration of the content server 20 in accordance with an embodiment of the present disclosure will be described.

[1-3. Functional Configuration of Content Server]

Figure 4:
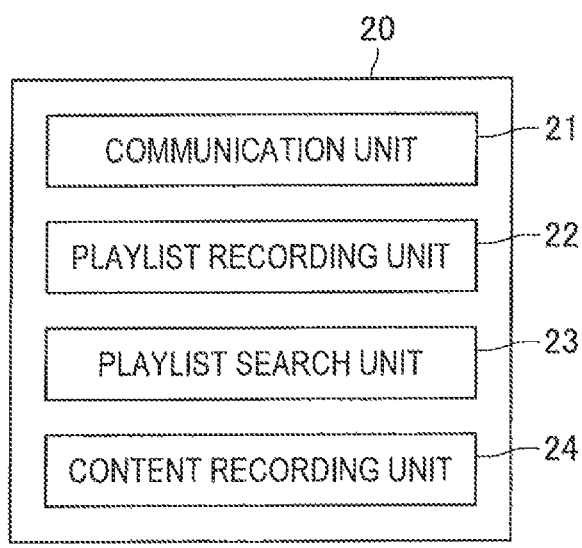
FIG. 4 is an explanatory diagram showing the functional configuration of a content server 20 in accordance with an embodiment of the present disclosure.

FIG. 4 is an explanatory diagram showing the functional configuration of the content server 20 in accordance with an embodiment of the present disclosure. Hereinafter, the functional configuration of the content server 20 in accordance with an embodiment of the present disclosure will be described with reference to FIG. 4.

As shown in FIG. 4, the content server 20 in accordance with an embodiment of the present disclosure includes a communication unit 21, a playlist recording unit 22, playlist search unit 23, and a content recording unit 24.

The communication unit 21 communicates with another device via the network 10. In this embodiment, the communication unit 21 communicates with, for example, the communication unit 110 of the portable terminal 100 and transmits a playlist or content held by the content server 20 to the communication unit 110 of the portable terminal 100 via the network 10.

The playlist recording unit 22 holds playlists. The playlists held by the playlist recording unit 22 have been created by the users of the portable terminals 100 and 200, and transmitted from the portable terminals 100 and 200 via the network 10.

The playlist search unit 23 searches for a playlist recorded on the playlist recording unit 22. In this embodiment, the playlist search unit 23, in response to a request from the portable terminal 100, searches the playlist recording unit 22 for a playlist having at least two content orders that match the content orders designated by a playlist used for the playback in the portable terminal 100. Then, the playlist search unit 23, if a playlist that matches the condition resides in the playlist recording unit 22, transmits the playlist to the portable terminal 100 from the communication unit 21 via the network 10.

The content recording unit 24 holds content. In this embodiment, when the portable terminal 100, in playing back content in accordance with a playlist, plays back content that is not held by the portable terminal 100, content recorded on the content recording unit 24 is transmitted to the portable terminal 100 from the communication unit 21 via the network 10 in response to a request from the portable terminal 100. Accordingly, the portable terminal 100 can acquire and play back the content from the content server 20 even if it is the content not held by the portable terminal 100.

The functional configuration of the content server 20 in accordance with an embodiment of the present disclosure has been described above with reference to FIG. 4. Although FIG. 4 shows a configuration in which the playlist recording unit 22 and the content recording unit 24 are provided in the same content server 20, it is needless to mention that the present disclosure is not limited to such example. Next, the operation of the portable terminal 100 in accordance with an embodiment of the present disclosure will be described.

[1-4. Operation of Portable Terminal]

Figure 5:
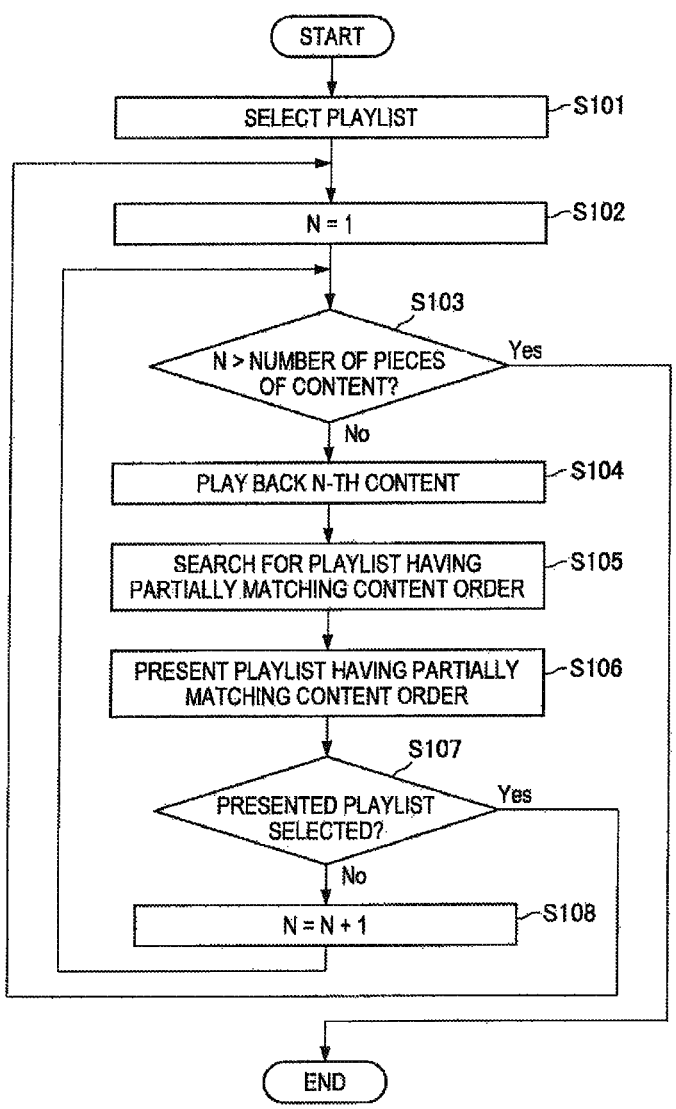
FIG. 5 is a flowchart showing the operation of the portable terminal 100 in accordance with an embodiment of the present disclosure.

FIG. 5 is a flowchart showing the operation of the portable terminal 100 in accordance with an embodiment of the present disclosure. The flowchart shown in FIG. 5 shows the operation performed when content is played back on the basis of a playlist. Hereinafter, the operation of the portable terminal 100 in accordance with an embodiment of the present disclosure will be described with reference to FIG. 5.

In order for the portable terminal 100 to play back content on the basis of a playlist, the user of the portable terminal 100 first selects a playlist stored in the storage unit 160 (step S101). The playlist is selected by the user of the portable terminal 100 operating the operation unit 150. The method of displaying the playlist selected in step S101 above on the image display unit 120 will be described later.

When the playlist stored in the storage unit 160 is selected, the portable terminal 100 performs a process of selecting from among the playlists recoded on the content server 20 a playlist having at least two content orders that match the content orders designated in the playlist stored in the storage unit 160 and downloading it from the content server 20. The playlist acquisition unit 141 sets the value of the variable N to 1 to acquire the playlist from the content server 20 (step S102).

Next, the playlist acquisition unit 141 determines if the value of the variable N is above the number of pieces of content included in the selected playlist (step S103). If the value of the variable N is determined to be above the number of pieces of content included in the selected playlist in step S102, the process is terminated. Meanwhile, if the value of the variable N is determined to be less than or equal to the number of pieces of content included in the selected playlist in step S102, the content playback unit 143 plays back the N-th content in the playlist (step S104), and the playlist acquisition unit 141 searches the content server 20 for a playlist having a partially matching content order (step S105).

When the playlist acquisition unit 141 acquires a playlist having a partially matching content order from the content server 20, the playlist display unit 142 presents the playlist acquired by the playlist acquisition unit 141 to the image display unit 120 together with the playlist selected in step S101 above (step S106). The method of displaying the playlist selected in step S101 above together with the playlist acquired in step S105 above on the image display unit 120 will be described later.

When the playlist acquired by the playlist acquisition unit 141 and the playlist selected in step S101 above are displayed together on the image display unit 120 in step S106 above, the content playback unit 143 determines if the playlist acquired by the playlist acquisition unit 141 in step S106 above is selected by the user (step S107).

If the playlist acquired by the playlist acquisition unit 141 is determined to be selected by the user in step S107 above, the flow returns to step S102 above, and the playlist acquisition unit 141 sets the value of the variable N to 1 to acquire a playlist from the content server 20.

Meanwhile, if the playlist acquired by the playlist acquisition unit 141 is not determined to be selected by the user in step S107 above, the playlist acquisition unit 141 increments the value of the variable N by one (step S108), and the flow returns to the determination in step S103 above.

As describe above, while the content playback unit 143 plays back content in accordance with a playlist stored in the storage unit 160, the playlist acquisition unit 141 acquires from the content server 20 a playlist whose playback order of content matches the playback order of at least a part of the content of the selected playlist. As described above, by acquiring a playlist having at least a partially matching content order from the content server 20, the portable terminal 100 can present to the user a playlist that suits the preference of the user.

Figure 6:
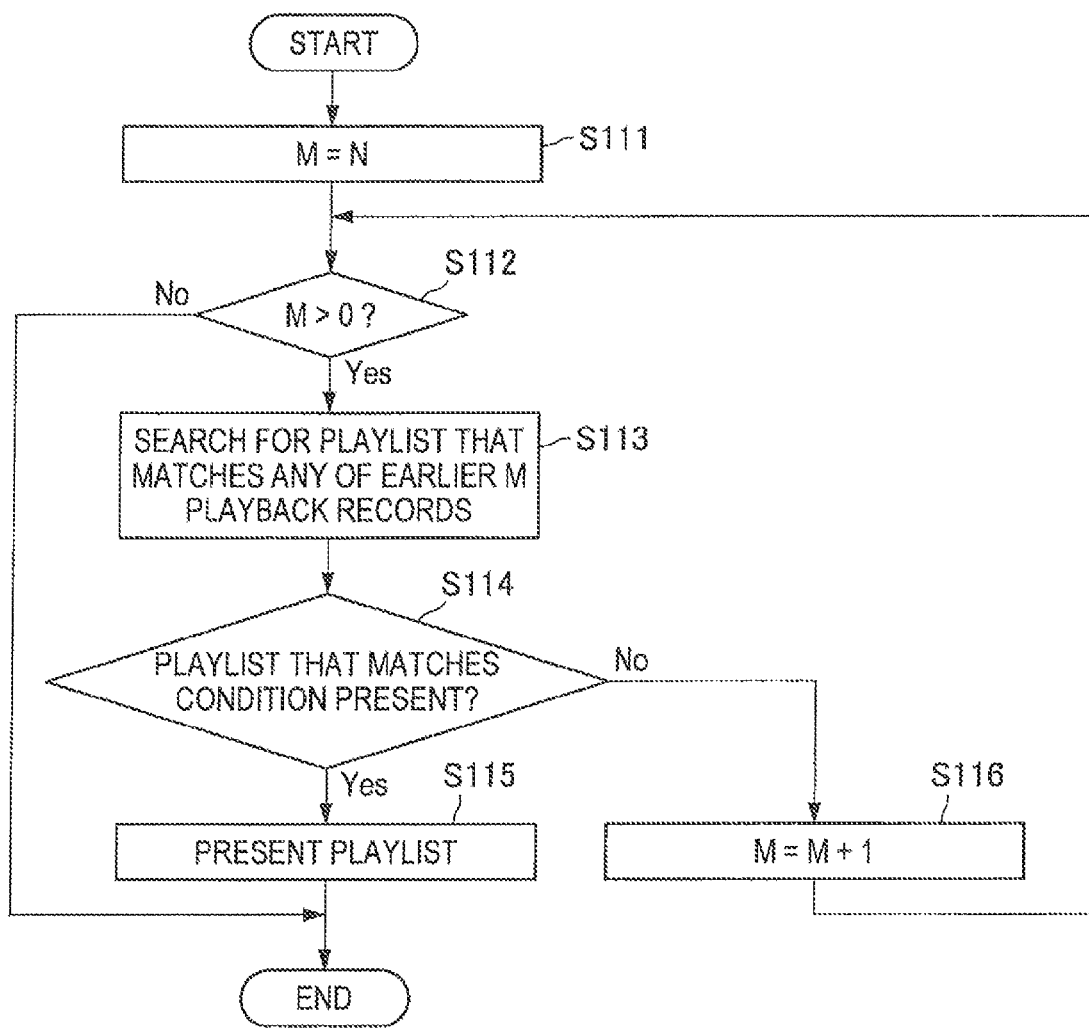
FIG. 6 is a flowchart showing a process of searching for a playlist recorded on the content server 20.

Herein, a process of searching for a playlist recorded on the content server 20 in step S105 above will be described in detail. FIG. 6 is a flowchart showing a process of searching for a playlist recorded on the content server 20. The description below is based on the assumption that the process shown in FIG. 6 is executed by the playlist search unit 23 of the content server 20. Hereinafter, a process of searching for a playlist recorded on the content server 20 will be described in detail with reference to FIG. 6.

When the playlist search unit 23 searches for a playlist recorded on the playlist recording unit 22 in response to a request from the portable terminal 100, the playlist search unit 23 first sets the variable of the variable M to the value of the variable N in FIG. 5 (step S111). The playlist search unit 23, after setting the value of the variable M to the value of the variable N in FIG. 5, determines if M is greater than 0 (step S112).

If M is determined to be greater than 0 in step S112 above, the playlist search unit 23 searches the playlist recording unit 22 for a playlist that matches any of the earlier M playback records in the portable terminal 100 (step S113). Herein, if a playlist matches any of the earlier playback records may be determined on the basis of whether the title of the content matches or whether each of the title and the creator of the content matches. Meanwhile, if M is determined to be less than or equal to zero, that is, M=0 in step S112 above, the playlist search unit 23 terminates the search process without presenting the playlist to the portable terminal 100.

Then, the playlist search unit 23 determines the presence or absence of a playlist that matches the search condition in step S113 above (step S114). If a playlist that matches the search condition in step S113 above is determined to be present in step S114, the playlist search unit 23 presents a playlist that matches the condition to the portable terminal 100 (step S115), and terminates the search process. Meanwhile, if a playlist that matches the search condition in step S113 above is determined to be absent in step S114, the playlist search unit 23 decrements the variable M by one (S116) and the flow returns to step S112 above.

If a plurality of playlists that match the search condition in step S113 above are determined to be present in step S114 above, only a single playlist may be selected on the basis of a predetermined rule and presented to the portable terminal 100. For example, if a plurality of playlists that match the search condition in step S113 above are determined to be present in step S114 above, only an external playlist that was played back the most frequently may be selected and presented to the portable terminal 100. Information on the number of times of the playback may be counted by adequately counting the number of pieces of data transmitted from the portable terminals 100 and 200 when content is played back on the basis of the playlist.

If it is determined, for example, that a plurality of playlists that match the search condition in step S113 above are present in step S114 above, it is also possible to select only an external playlist that includes the smallest number of pieces of content, which is similar to the content included in the playlist to which the content played back by the content playback unit 143 belongs, or does not include such content, and present the playlist to the portable terminal 100.

Alternatively, if it is determined, for example, that a plurality of playlists that match the search condition in step S113 above are present in step S114 above, it is also possible to select only an external playlist that includes the largest number of pieces of content, which is similar to the content included in the playlist which the content played back by the content playback unit 143 belongs, and present the playlist to the portable terminal 100.

Herein, the level of similarity of content may be determined through a content analysis process using elements such as, when the content is music, for example, if the genre of the music is identical or close, if the tempo or melody of the music is identical, or if the artist is identical.

The process of searching for a playlist recorded on the content server 20 in step S105 above has been described above. Next, a specific example of display of a playlist will be described.

[1-5. Display of Playlist]

Figure 7:
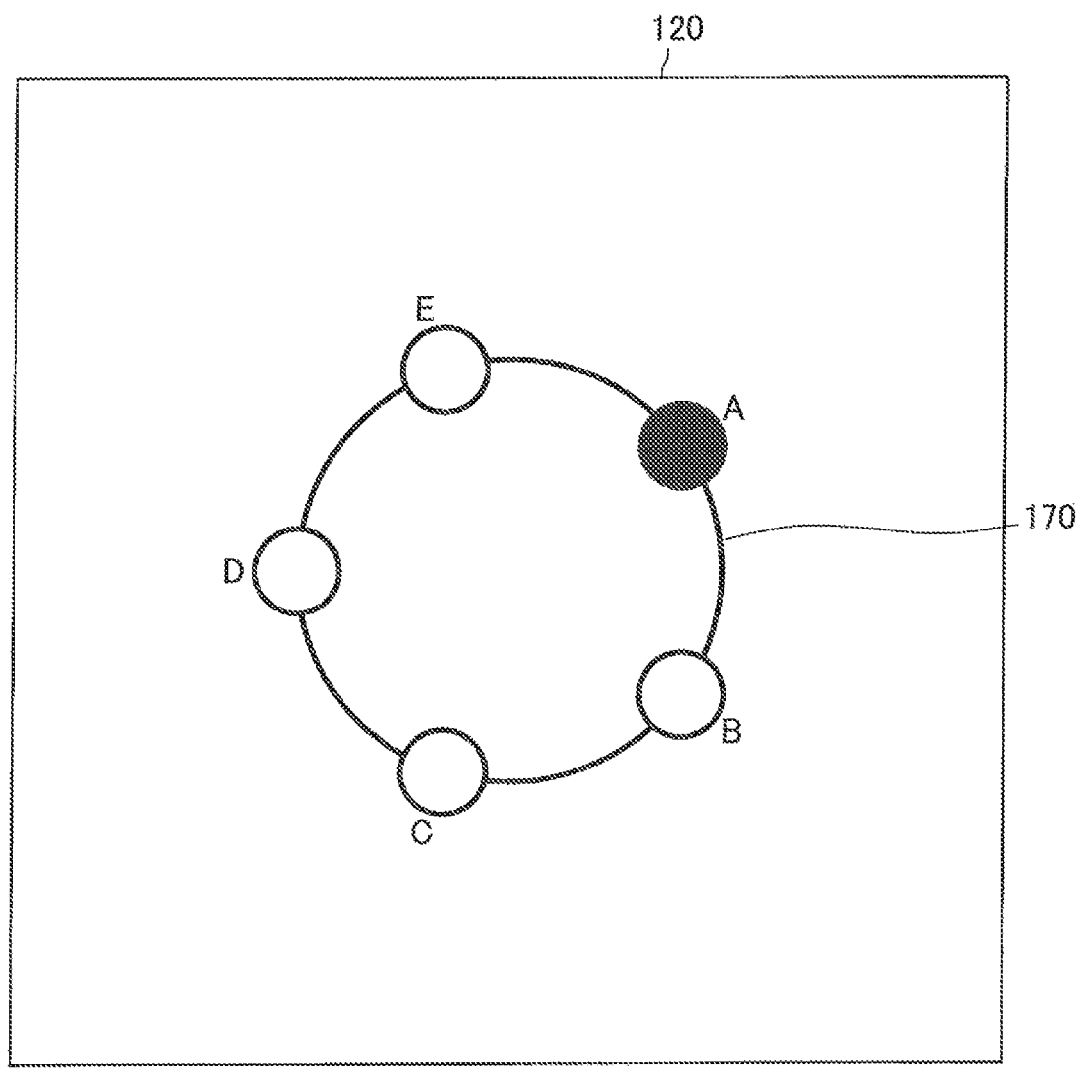
FIG. 7 is an explanatory diagram showing a display example of a playlist displayed on an image display unit 120 by the portable terminal 100.

As described above, in this embodiment, a playlist is displayed with a circle. FIG. 7 is an explanatory diagram showing a display example of a playlist displayed on the image display unit 120 by the portable terminal 100 in accordance with an embodiment of the present disclosure.

FIG. 7 shows a view in which a playlist 170 stored in the storage unit 160 is displayed with a circle on the image display unit 120 by the playlist display unit 142. In addition, five pieces of content A to E belonging to the playlist 170 are displayed with open circles (○) or closed circles (•) on the circumference of the playlist 170. In this embodiment, content that is being played back now is indicated by a closed circle (•) and content that is not being played back now is indicated by an open circle (○). FIG. 7 shows that the content A is being played back on the portable terminal 100. Needless to say, the display pattern of the content is not limited to such example. In addition, the image display unit 120 may, when content is played back on the basis of the playlist 170, concurrently display information on the content that is being played back now.

Figure 8:
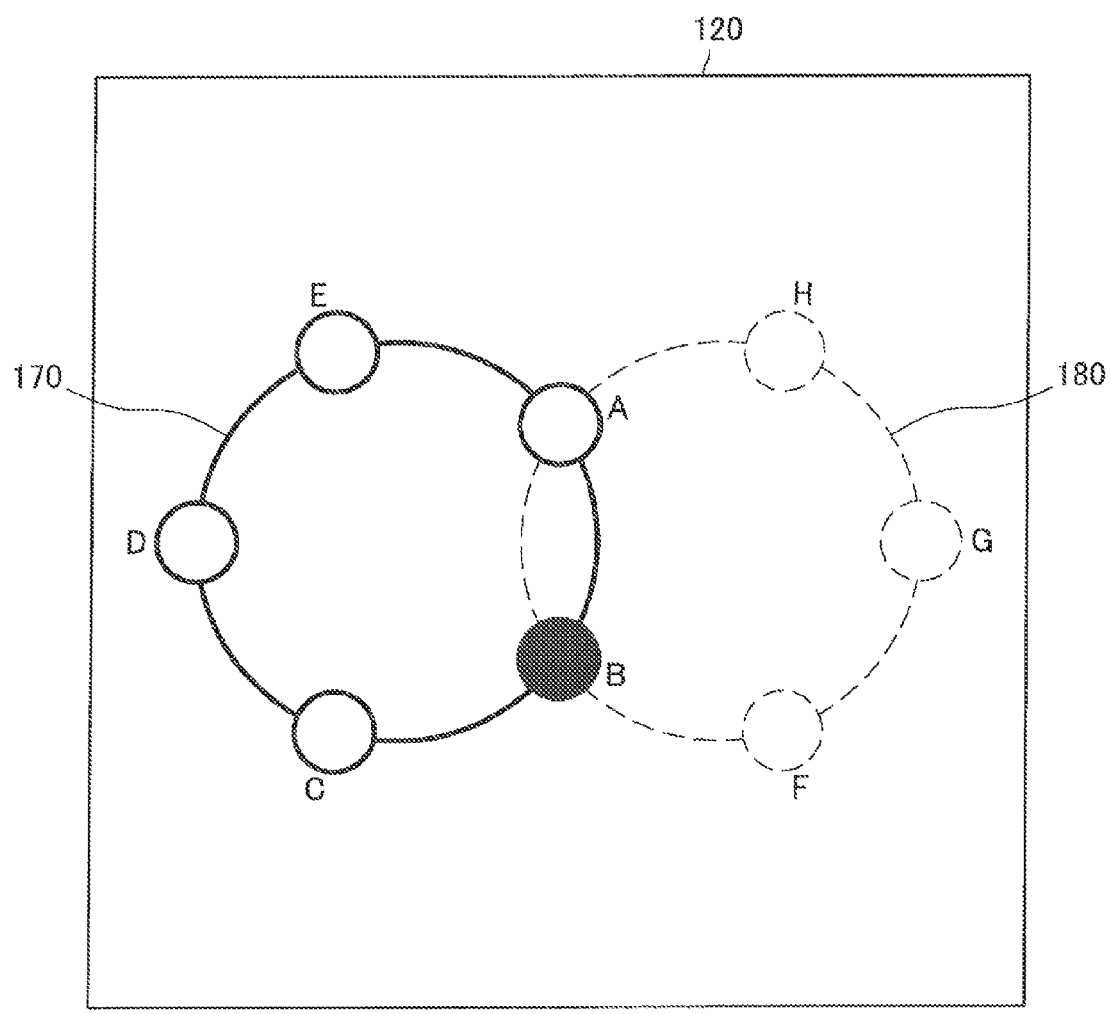
FIG. 8 an explanatory diagram showing a display example of playlists displayed on the image display unit 120 by the portable terminal 100.

FIG. 8 is an explanatory diagram showing a display example of playlists displayed on the image display unit 120 by the portable terminal 100 in accordance with an embodiment of the present disclosure.

FIG. 8 shows a view in which each of the playlist 170 stored in the storage unit 160 and a playlist 180 acquired by the playlist acquisition unit 141 from the content server 20 is displayed with a circle on the image display unit 120 by the playlist display unit 142. The playlist 180 includes five pieces of content A, B, F, G, and H. Then, the playlist 170 and the playlist 180 are displayed on the image display unit 120 by the playlist display unit 142 such that the playlists cross each other at positions of the content A and the content B that are common.

Although the playlist 180 acquired from the content server 20 is shown by a dashed line in FIG. 8 for description purposes, it is needless to mention that the present disclosure is not limited to such example. For example, the playlists may be distinguished by displaying the playlist 170 stored in the storage unit 160 and the playlist 180 acquired by the playlist acquisition unit 141 from the content server 20 in different colors. Alternatively, even if the playlists are displayed in similar colors, the playlists may be distinguished by varying the shades of the colors.

As described above, when the playlist display unit 142 displays the playlist 170 and the playlist 180 on the image display unit 120, the user can figure out the playback order of which content of the playlist that the user has created matches the playback order of content of the playlist acquired from the content server 20.

As shown in FIG. 8, each of the playlist 170 and the playlist 180 displayed with a circle on the image display unit 120 is in a state in which the playlist can be selected by the user. When the user selects one of the playlists by operating the operation unit 150, the content playback unit 143 executes playback on the basis of the playlist selected by the user. When the content playback unit 143 executes playback on the basis of the selected by the user, the playlist display unit 142 may explicitly show which playlist is the playlist selected by the user.

Figure 9:
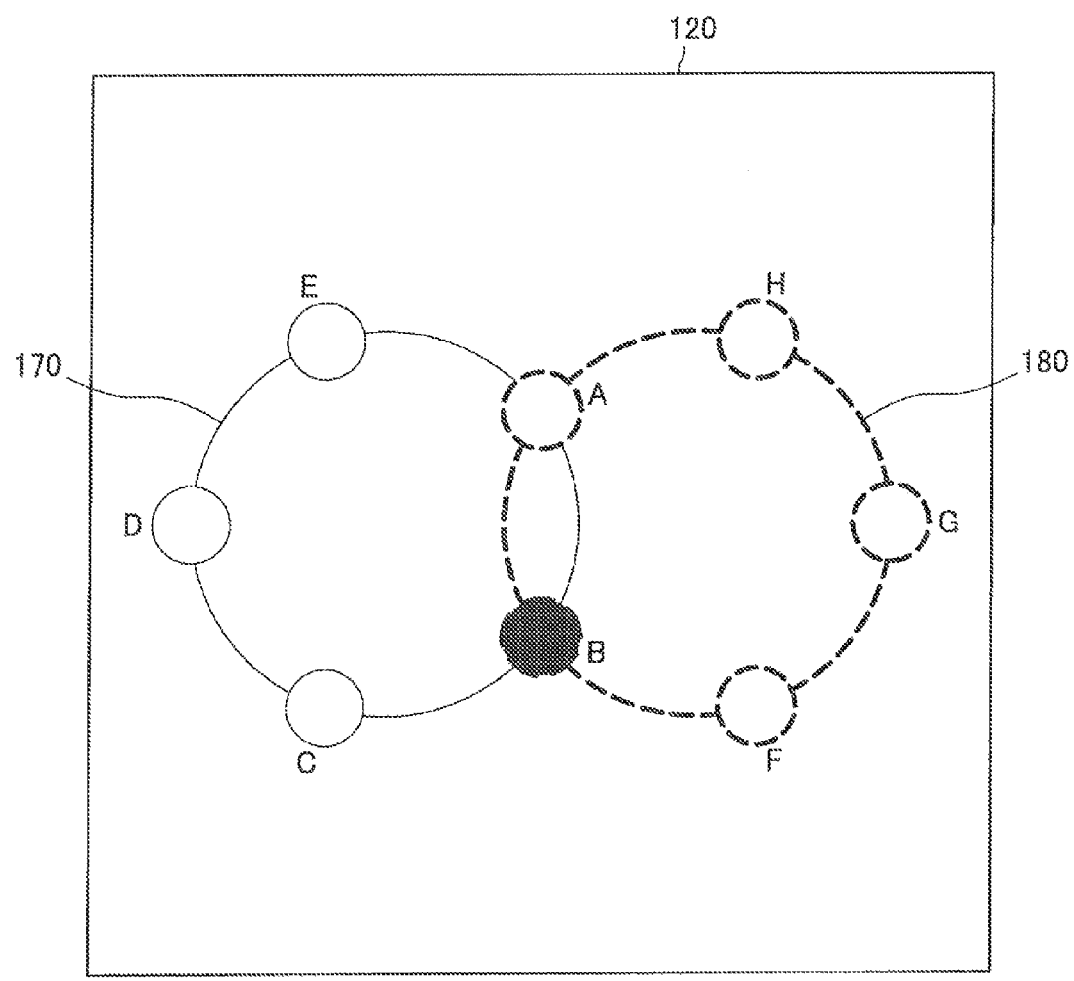
FIG. 9 is an explanatory diagram showing a display example of playlists displayed on the image display unit 120 by the portable terminal 100.

FIG. 9 is an explanatory diagram showing a display example of playlists displayed on the image display unit 120 by the portable terminal 100 in accordance with an embodiment of the present disclosure. FIG. 9 shows a display example when the user selects the playlist 180. As described above, by explicitly showing which playlist is the playlist selected by the user by displaying the playlist 180 selected by the user in dark color, for example, it becomes possible to clearly present to the user on the basis of which playlist the playback is being performed now.

The playlist 180 acquired from the content server 20 may include content that is not stored in the storage unit 160. In such case, the content acquisition unit 144 acquires from the content server 20 content that is not stored in the storage unit 160. The content acquired by the content acquisition unit 144 is played back by the content playback unit 143.

Each of FIGS. 8 and 9 shows an example in which playlists are displayed on the image display unit 120 by the playlist display unit 142 when the playback order of two pieces of content matches. However, when the playback order of three or more pieces of content matches, it would be difficult to make two circles cross each other at three or more points. Thus, the playlist display unit 142 may, when displaying the playlists, deform the display patterns of the playlists or the content on the playlists.

Figure 10:
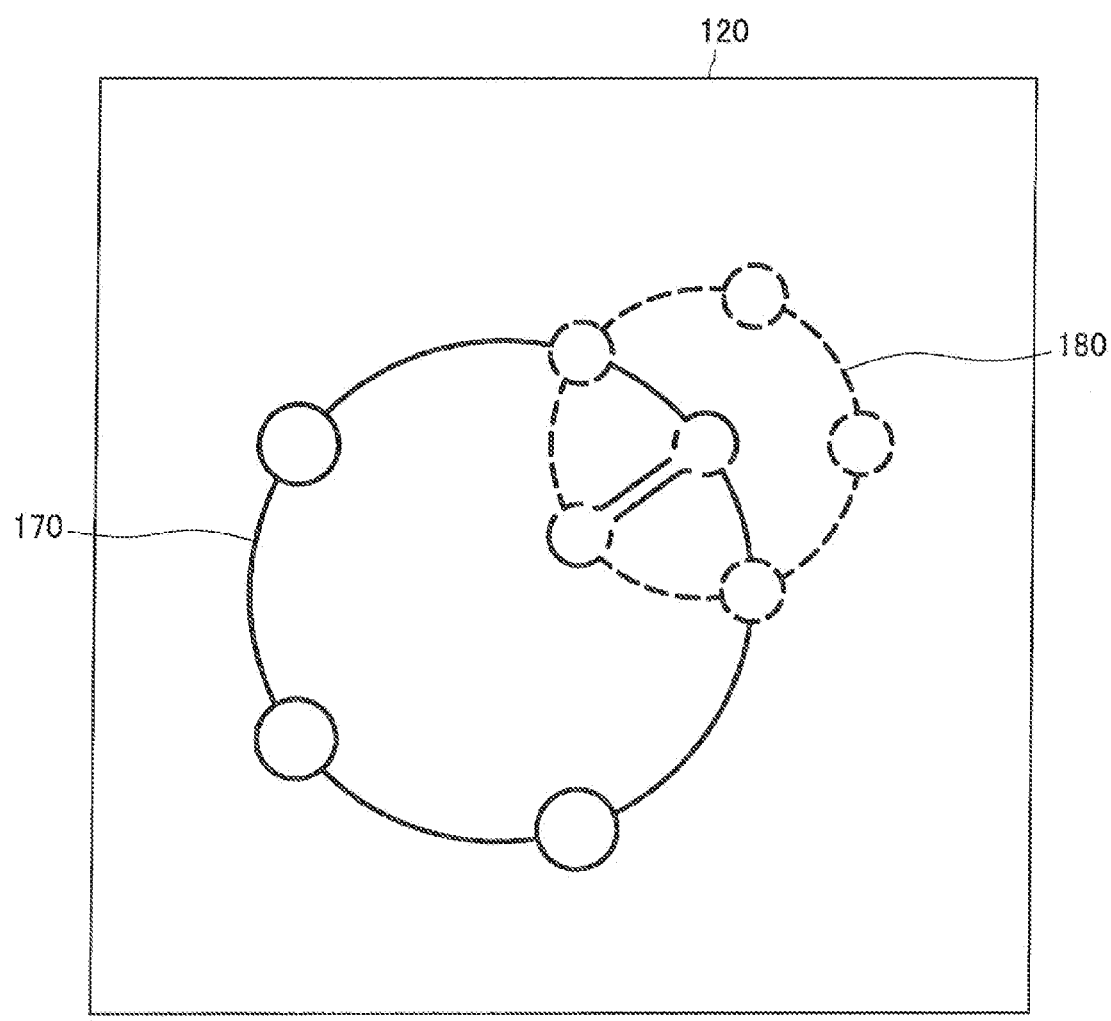
FIG. 10 is an explanatory diagram showing a display example of playlists displayed on the image display unit 120 by the portable terminal 100.

FIG. 10 is an explanatory diagram showing a display example of playlists displayed on the image display unit 120 by the portable terminal 100 in accordance with an embodiment of the present disclosure. FIG. 10 shows a view in which each of the playlist 170 stored in the storage unit 160 and the playlist 180 acquired by the playlist acquisition unit 141 from the content server 20 is displayed with a circle on the image display unit 120 by the playlist display unit 142. Herein, it is assumed that the playback orders of three pieces of content match between the playlist 170 and the playlist 180.

When the playback orders of three pieces of content match between the playlist 170 and the playlist 180, the playlist display unit 142 deforms the display pattern of the content on the playlists and causes the image display unit 120 to display the content in the deformed display pattern. As described above, when the playlist display unit 142 displays the playlist 170 and the playlist 180 on the image display unit 120, and the display pattern of the content on the playlists is deformed and displayed on the image display unit 120, it becomes possible for the user to figure out the playback order of which content of the playlist that the user has created matches the playback order of content of the playlist acquired from the content server 20.

Figure 11:
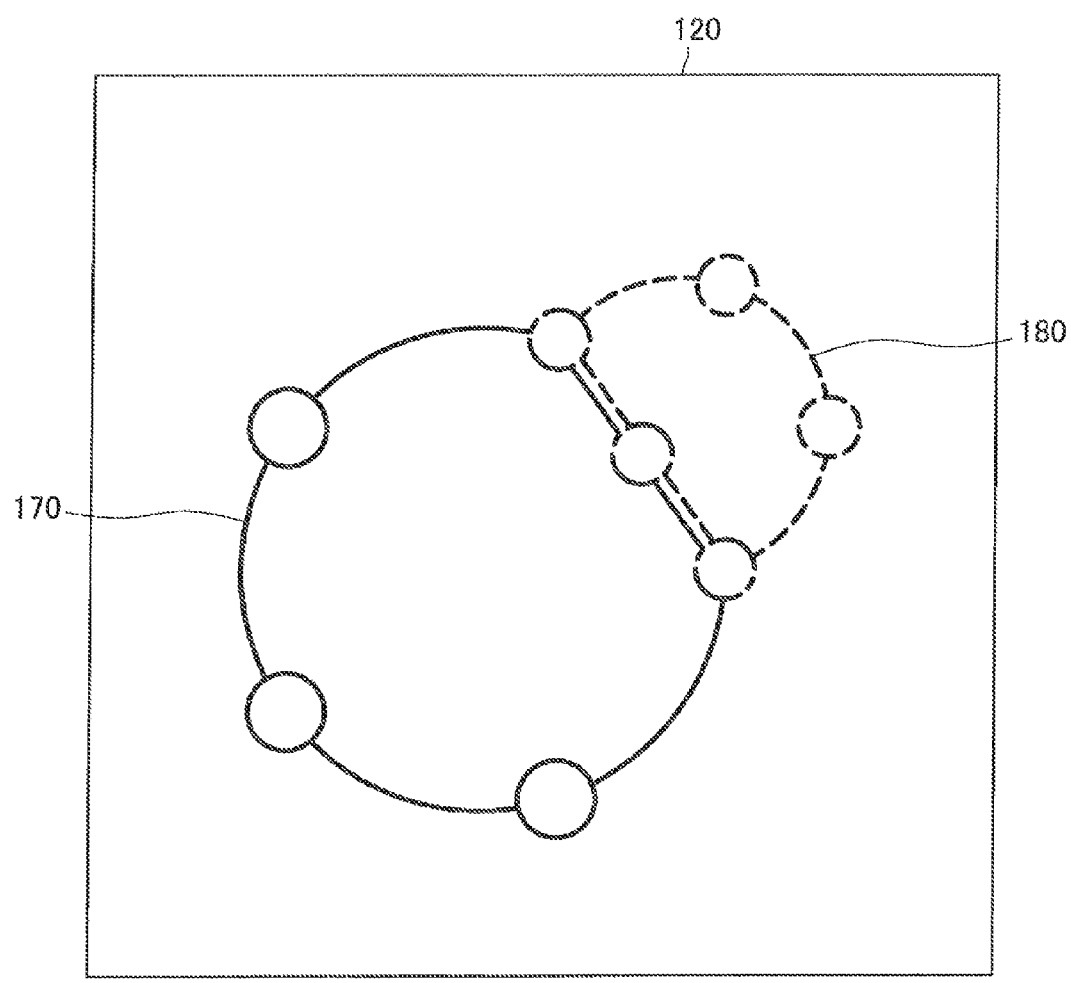
FIG. 11 is an explanatory diagram showing a display example of playlists displayed on the image display unit 120 by the portable terminal 100.

FIG. 11 is an explanatory diagram showing a display example of playlists displayed on the image display unit 120 by the portable terminal 100 in accordance with an embodiment of the present disclosure. FIG. 11 shows a view in which each of the playlist 170 stored in the storage unit 160 and the playlist 180 acquired by the playlist acquisition unit 141 from the content server 20 is displayed with a circle on the image display unit 120 by the playlist display unit 142. Herein, the playback orders of three pieces of content match between the playlist 170 and the playlist 180.

When the playback orders of three pieces of content match between the playlist 170 and the playlist 180, the playlist display unit 142 deforms the display patterns of the playlists and causes the image display unit 120 to display the playlists in the deformed display patterns. As described above, when the playlist display unit 142 displays the playlist 170 and the playlist 180 on the image display unit 120 and deforms the display patterns of the playlists and displays them on the image display unit 102, it becomes possible for the user to figure out the playback order of which content of the playlist that the user has created matches the playback order of content the playlist acquired from the content server 20.

2. Conclusion

As described above, according to an embodiment of the present disclosure, the portable terminal 100, in playing back content on the basis of a playlist, displays the playlist with a circle on the screen. Then, the potable terminal 100, when playing back content on the basis of the playlist, searches a content server for a playlist having a matching playback order of two or more pieces of content. If the content server contains a playlist having a matching playback order of two or more pieces of content, the portable terminal 100 acquires the playlist from the content server, and displays the plurality of playlists so that the playlists cross each other at the position of the same playback order of content.

As described above, the portable terminal 100 in accordance with an embodiment of the present disclosure can, by acquiring a playlist having a matching playback order of two or more pieces of content, present to the user of the portable terminal 100 a playlist that appears to suit the preference of the user.

Although the portable terminal 100 has been described above as a device that plays back content on the basis of a playlist in an embodiment of the present disclosure described above, it is needless to mention that the present technology is not limited to such example. That is, it is needless to mention that the present technology can be applied to any device that has a function of connecting to a network and can play back content on the basis of a playlist.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

For example, although the aforementioned embodiment is based on a condition that a playlist whose playback order of content matches the playback order of two or more pieces of content of the playlist that is being played back by the portable terminal 100 is a condition for acquiring a playlist from the content server 20, the present disclosure is not limited to such example. For example, if the content server 20 contains no playlist whose playback order of content matches the playback order of two or more pieces of content of the playlist that is being played back, a playlist whose playback order of at least two consecutive pieces of content matches the reverse order of the playback order of content the playlist that is being played back may be acquired. This is because, even if the playback order of content of a playlist does not match the playback order of content of the playlist that is being played back, if the playback order of content of a playlist matches the reverse order of the playback order of content of the playlist that is being played back, the playlist can be determined to be similar to the taste of the playlist that is being played back by the portable terminal 100.

Additionally, the present technology may also be configured as below.

(1)

A playback device comprising:
a content playback unit configured to playback content;
a playlist acquisition unit configured to acquire, while the playback unit is playing hack the content on the basis of a playlist, at least one external playlist from outside, the external playlist having at least two pieces of content that are common to content in the playlist and having a matching playback order of at least the two consecutive pieces of content; and
a playlist display unit configured to display the playlist and the external playlist acquired by the playlist acquisition unit such that the playlists are linked at positions of the consecutive matching pieces of content.

(2)

The playback device according to (1), wherein the content playback unit, when the external playlist is selected while the playlist display unit displays the playlist and the external playlist by linking the playlists together, plays back content in accordance with the selected external playlist.

(3)

The playback device according to (2), further comprising a content acquisition unit configured to, when the content playback unit plays back content in accordance with the selected external playlist, if content included in the external playlist does not reside in the playback device, acquire the content via a network.

(4)

The playback device according to any one of (1) to (3), wherein if the playlist acquisition unit is not able to acquire the external playlist having a playback order of at least two consecutive pieces of content that matches a playback order of content of a first playlist, the playlist acquisition unit acquires the external playlist having a playback order of at least two consecutive pieces of content that matches a reverse order of the playback order of the content of the first playlist.

(5)

The playback device according to any one of (1) to (4), wherein the playlist display unit displays a playlist in a circular shape by arranging content on a circumference of the circle.

(6)

The playback device according to (5), wherein, if a playlist to which content played back by the playback unit belongs and the external playlist acquired by the playlist acquisition unit have three or more pieces of consecutive matching content, the playlist display unit deforms and displays the playlists.

(7)

The playback device according to any one of (1) to (6), wherein the playlist acquisition unit, when a plurality of external playlists each having a matching playback order of at least two consecutive pieces of content exist, acquires only an external playlist that has been played back the most frequently.

(8)

The playback device according to any one of (1) to (7), wherein the playlist acquisition unit, when a plurality of external playlists each having a matching playback order of at least two consecutive pieces of content exist, acquires only an external playlist that contains the smallest number of pieces of content that are similar to content included in the playlist to which the content played back by the playlist unit belongs, or does not contain the content.

(9)

The playback device according to any one of (1) to (8), wherein the playlist acquisition unit, when a plurality of external playlists each having a matching playback order of at least two consecutive pieces of content exist, acquires only an external playlist that contains the largest number of pieces of content that are similar to content included in the playlist to which the content played back by the playlist unit belongs.

(10)

The playback device according to any one of (1) to (9), wherein the playlist acquisition unit determines commonality of pieces of content by determining if titles of the content match.

(11)
A playback method comprising:
playing back content;
acquiring, while the playback step is playing back content on the basis of a playlist, at least one external playlist from outside, the external playlist having a playback order of at least two consecutive pieces of content that matches a playback order of content of the playlist; and
displaying the playlist and the external playlist acquired by the playlist acquisition step such that the playlists are linked at positions of consecutive matching content.

(12)
A computer program for causing a computer to execute:
playing back content;
acquiring, while the playback step is playing back content on the basis of a playlist, at least one external playlist from outside, the external playlist having a playback order of at least two consecutive pieces of content that matches a playback order of content of the playlist; and
displaying the playlist and the external playlist acquired by the playlist acquisition unit such that the playlists are linked at positions of consecutive matching content.

The present disclosure contains subject matter related to that disclosed in Japanese Priority Patent Application JP 2011-107109 filed in the Japan Patent Office on May 12, 2011, the entire content of which is hereby incorporated by reference.

What is claimed is:

1. A playback device comprising:
a playlist storage unit configured to store a first playlist identifying pieces of content arranged in a playback order;
a content playback unit configured to playback content identified in the first playlist;
a playlist acquisition unit configured to acquire, while the playback unit is playing back the content identified in the first playlist, at least one external playlist from outside, the external playlist, prior to being acquired, having at least two pieces of content that are common to content in the first playlist and having a playback order of at least two consecutive pieces of content that match the playback order of pieces of content identified in the first playlist; and
a playlist display unit configured to display the first playlist and the external playlist acquired by the playlist acquisition unit such that the playlists are linked at positions of the matching consecutive pieces of content.

2. The playback device according to claim 1, wherein the content playback unit, when the external playlist is selected while the playlist display unit displays the first playlist and the external playlist by linking the playlists together, plays back content in accordance with the selected external playlist.

3. The playback device according to claim 2, further comprising a content acquisition unit configured to, when the content playback unit plays back content in accordance with the selected external playlist, if content included in the external playlist does not reside in the playback device, acquire the content via a network.

4. The playback device according to claim 1, wherein if the playlist acquisition unit is not able to acquire the external playlist having a playback order of at least two consecutive pieces of content that matches the playback order of pieces of content identified in the first playlist, the playlist acquisition unit acquires the external playlist having a playback order of at least two consecutive pieces of content that matches a reverse order of the playback order of the pieces of content identified in the first playlist.

5. The playback device according to claim 1, wherein the playlist display unit displays a playlist in a circular shape by arranging content on a circumference of the circle.

6. The playback device according to claim 5, wherein, if a playlist to which content played back by the playback unit belongs and the external playlist acquired by the playlist acquisition unit have three or more pieces of consecutive matching content, the playlist display unit deforms and displays the playlists.

7. The playback device according to claim 1, wherein when a plurality of external playlists each having a playback order of at least two consecutive pieces of content that matches the playback order of pieces of content identified in the first playlist exist, the playlist acquisition unit acquires only an external playlist that has been played back the most frequently.

8. The playback device according to claim 1, wherein when a plurality of external playlists each having a playback order of at least two consecutive pieces of content that matches the playback order of pieces of content identified in the first playlist exist, the playlist acquisition unit acquires only an external playlist (a) that contains the smallest number of pieces of content that are similar to content included in the playlist to which the content played back by the playlist unit belongs, or (b) that does not contain the content.

9. The playback device according to claim 1, wherein when a plurality of external playlists each having a playback order of at least two consecutive pieces of content that matches the playback order of pieces of content identified in the first playlist exist, the playlist acquisition unit acquires only an external playlist that contains the largest number of pieces of content that are similar to content included in the playlist to which the content played back by the playlist unit belongs.

10. The playback device according to claim 1, wherein the playlist acquisition unit determines commonality of pieces of content by determining if titles of the content match.

11. A playback method comprising:
providing a first playlist identifying pieces of content arranged in a playback order;
playing back content identified in the first playlist;
acquiring, while the playback step is playing back content identified in the first playlist, at least one external playlist from outside, the external playlist, prior to being acquired, having at least two pieces of content that are common to content in the first playlist and having a playback order of at least two consecutive pieces of content that matches the playback order of pieces of content identified in the first playlist; and
displaying the first playlist and the external playlist acquired by the playlist acquisition step such that the playlists are linked at positions of the matching consecutive pieces of content.

12. A non-transitory computer readable storage on which is stored a computer program for causing a computer to execute:
playing back content identified in a first playlist that identifies pieces of content arranged in a playback order;
acquiring, while the playback step is playing back content identified in the first playlist, at least one external playlist from outside, the external playlist, prior to being acquired, having at least two pieces of content that are common to content in the first playlist and having a playback order of at least two consecutive pieces of content that matches the playback order of pieces of content identified in the first playlist; and displaying the first playlist and the external playlist acquired by the playlist acquisition unit such that the playlists are linked at positions of the matching consecutive pieces of content.

\* \* \* \* \*